United States Patent
Weishut et al.

(10) Patent No.: US 6,842,653 B2
(45) Date of Patent: Jan. 11, 2005

(54) METHOD AND APPARATUS FOR DISPLAYING A MULTI-LEVEL MENU

(75) Inventors: Gideon Martin Reinier Weishut, Eindhoven (NL); Duco Annardo David Das, Eindhoven (NL); Lucas Jacobus Franciscus Geurts, Eindhoven (NL); Herman Jan Ter Horst, Eindhoven (NL); Erik Gerardus Hubertus Bastiaans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 219 days.

(21) Appl. No.: 09/804,002

(22) Filed: Mar. 12, 2001

(65) Prior Publication Data

US 2001/0025201 A1 Sep. 27, 2001

(30) Foreign Application Priority Data

Mar. 17, 2000 (EP) .............................................. 00200963

(51) Int. Cl.$^7$ ................................................. G06F 3/00
(52) U.S. Cl. ........................ 700/83; 345/841; 345/721; 725/45
(58) Field of Search ............................... 700/17, 83–85; 345/841, 853, 843, 810, 825, 828, 854, 834, 719, 721, 855, 840; 348/517, 564, 569; 725/41, 45, 40, 39, 56, 43, 44

(56) References Cited

U.S. PATENT DOCUMENTS

| | | | | |
|---|---|---|---|---|
| 5,179,653 A | * | 1/1993 | Fuller | 345/840 |
| 5,623,613 A | * | 4/1997 | Rowe et al. | 345/841 |
| 5,704,051 A | * | 12/1997 | Lane et al. | 345/855 |
| 5,737,029 A | * | 4/1998 | Ohkura et al. | 725/56 |
| 6,008,803 A | | 12/1999 | Rowe et al. | 345/327 |
| 6,133,911 A | * | 10/2000 | Kim | 345/719 |
| 6,292,188 B1 | * | 9/2001 | Carlson et al. | 345/854 |
| 6,448,987 B1 | * | 9/2002 | Easty et al. | 345/834 |

FOREIGN PATENT DOCUMENTS

WO    WO0065429    11/2000

\* cited by examiner

*Primary Examiner*—Leo Picard
*Assistant Examiner*—Steven R. Garland

(57) ABSTRACT

The invention relates to a method of displaying a multi-level menu. A first menu level is displayed in a first display area, while, in response to selection of a menu item of the first menu level, a second menu level is displayed in a second display area having a fixed position relative to the first display area, irrespective of the position of the selected menu item of the first menu level. Further menu levels may be displayed in further display areas having a fixed position with respect to the other display areas. Selected items of different menu levels may be visually connected.

18 Claims, 1 Drawing Sheet

METHOD AND APPARATUS FOR DISPLAYING A MULTI-LEVEL MENU

FIELD OF THE INVENTION

The invention relates to a method of displaying a multi-level menu, comprising the steps of displaying menu items of a first menu level in a first display area, and displaying, in response to a selection of a menu item of the first menu level, menu items of a second menu level in a second display area, the second menu level being subordinate to the selected menu item of the first menu level.

The invention further relates to a display device for carrying out the steps of the above method.

The invention further relates to a computer program product for performing, when executed on a programmable computing device, the steps of the above method.

BACKGROUND OF THE INVENTION

A method of the type defined above is widely used in computer software and television receivers with an on-screen menu system. Generally, the first menu level is permanently displayed or pops up in response to a suitable user command. The user is enabled to select a menu item of the first menu level, and if there is a second menu level subordinate to the selected menu item, a second menu pops up which shows the menu items of a second menu level. Each of the menu items of the second menu level may have further subordinate menu levels, which in turn pop up in response to selection of the respective menu item. In such a way multi-level menu systems of indefinite depth may be displayed.

A disadvantage of the known method is that the menu, particularly the subordinate menu levels, cover up other displayed information and thus disturb the activity to which the multi-level menu relates.

OBJECT AND SUMMARY OF THE INVENTION

It is an object of the invention to provide an improved method and display device of the type defined in the opening paragraph. To that end, the method according to the invention is characterized in that the second display area has a fixed position with respect to the first display area, irrespective of the position of the selected menu item of the first menu level. In this way a more restful and less disturbing user interface is obtained. For the first and the second menu level dedicated display areas are used which have a fixed position on the display screen or at least have a fixed mutual position. As a result, a main area of the screen can remain dedicated to the display of information relating to the main activity at hand. Moreover, the user knows in advance where the menu items of the second menu level will be displayed, which further enhances the ease of use. Preferably, the first and second display area have fixed dimensions, which gives a very stable layout, but the display area may also grow or shrink in dependence on the number and/or size of the respective menu items. In the latter scenario, the first menu item of the second menu level preferably has a fixed position.

An variant of the method according to the invention is characterized in that the method further comprises a step of visually connecting the selected menu item of the first menu level and a menu item of the second menu level. Since the first and the second display area have a fixed mutual position, it may occur that the menu items of the second menu level are more or less remote from the selected menu item of the first menu level. This embodiment alleviates this inconvenience, by displaying a visual connection, e.g. a straight or dotted line, between said menu items. In this way it is always clear to which menu item of the first menu level the menu items of the second menu level are subordinate.

An embodiment of the method according to the invention is characterized in that the first and the second display area are oblong and arranged substantially orthogonally relative to each other. This has the advantage that the two levels are clearly distinct on the screen. Particularly if the first and the second display area meet each other at their respective ends, it is clearly indicated that the two menu levels belong together but allow separate user operation. Another advantage is that selection at the two menu levels may be performed by means of the customary four 'arrow' keys of, for example, a remote control, a first pair of opposite arrows being used to control the first menu level and the other pair to control the second menu level.

An variant of the method according to the invention is characterized in that the first and the second display area extend along adjacent borders of a third display area. The third display area may be dedicated to the display of information relating to the main activity. It is an achievement of the invention that the third display area is never disturbed by the operation of the multi-level menu. If the third display area is a rectangular window, the first and second the display area may extend, for example, along the left and the upper border of the window. In this way it is clear to the user that the multi-level menu controls the activity in the window. If the menu has more than two levels, a third menu level may be displayed in a display area extending along the right border of the window, and a fourth menu level may be displayed in a display area extending along the lower border of the window. If at least two borders of the third display area coincide with borders of the display screen, for example if the third display area covers substantially the whole display screen, each level of the multi-level menu may be operated by means of buttons adjacent the display screen having positions corresponding to the positions of the menu items of the respective menu levels. Alternatively, the menu may be operated by means of a touch sensitive area coinciding with the first and second display area. In comparison with conventional touch screen applications, this has the advantage that soiling due to touch operations is absent or restricted to a fixed area of the screen.

An variant of the method according to the invention is characterized in that the multi-level menu constitutes a database filter for selecting data objects in accordance with selected menu items, the method further comprising a step of displaying the selected objects in the third display area. Database filtering takes particular advantage of the method according to the invention, because it enables the user to observe at a glance which filter, as defined by the multi-level menu, is applied and which database objects are selected as a result of the filter. Since there is no disturbance of the third display area, the first and second menu level, and any further menu levels, may remain on the screen, hence the applied database filter is continuously displayed as respective menu item selections.

An variant of the method according to the invention is characterized in that the data objects are programs in an electronic program guide database, and the menu items of the first menu level correspond to main genres of the programs, and the menu items of the second menu level correspond to subgenres of a selected main genre of the first menu level. The method according to the invention is particularly suited for application to an electronic program guide (EPG), because the depth of the genre hierarchy is generally limited to two or three levels and ease of use if of paramount importance.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF EMBODIMENTS

Figure 1:
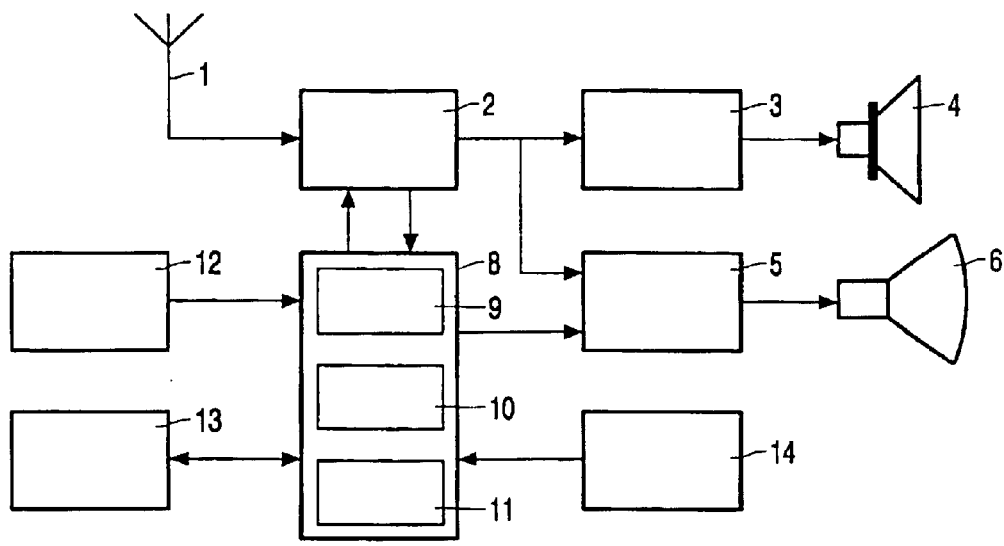
FIG. 1 shows a diagram of a TV-set as an apparatus embodying the invention.

FIG. 1 shows a diagram of a TV-set as an apparatus embodying the invention. TV signals are received from the ether by an antenna 1 or, alternatively, from a cable network. One of the TV signals is selected by a tuner 2, decoded and split into an audio signal, a video signal and a data signal. The audio signal is further processed by an audio processor 3 and a loudspeaker 4. The video signal is further processed by a video processor 5 and presented on a screen 6. The data signal is transmitted to a central processing unit (hereinafter "CPU") 8, which comprises one or more microprocessors capable of executing program instructions stored in a read-only memory (hereinafter "ROM") 14. These program instructions comprise parts of software modules including, inter alia, a user command module 9, an EPG module 10 and a profile module 11, which may be operating simultaneously in the CPU 8. Data processed by said software modules, e.g. EPG data and user profile information, may be stored in a non-volatile memory 13. The CPU 8 is capable of controlling functions of the TV-set and transmitting data to the video processor 5 to be presented on the screen 6. A user control unit 12, for example a remote control, receives user commands, and transmits them to the CPU 8 to be processed by the user command module 9. For example, when the user enters a channel number the CPU 8 controls the tuner 2 to select the corresponding channel, and sends data to the video processor 5 to present feedback on the screen 6, e.g. the preset number, the channel name and the program category being displayed for a few seconds.

The data signal is decoded from the TV signal by means of a teletext decoder (not shown), and includes, inter alia, EPG data which provide an overview of programs scheduled for the near future. The EPG data may comprise for each program attributes such as a title, the start time and duration, the channel number, and genre information. In response to a predetermined user command, the EPG module 10 is invoked to present a program schedule on the screen 6, as will be described hereinafter.

Figure 2:
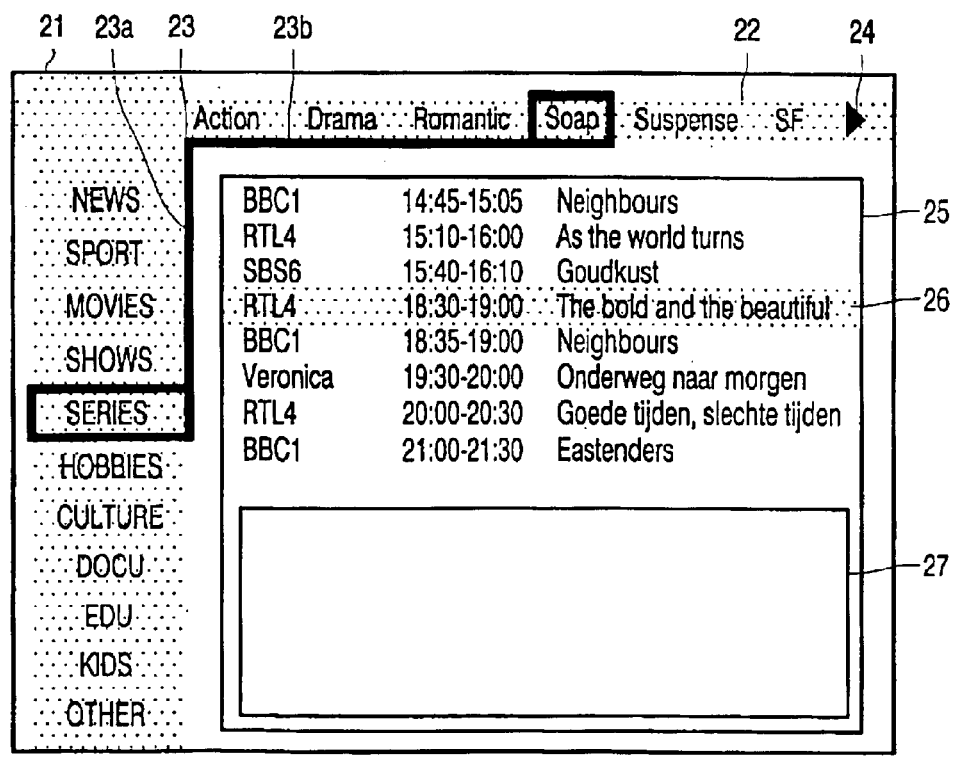
FIG. 2 shows an example of a screen representation of a multi-level genre filter menu.

FIG. 2 shows an example of a screen representation of a multi-level genre filter menu. A first display area 21 comprises labels of a plurality of main genres, such as News, Sport, Series etc. This main genre menu represents the first level of a multi-level genre filter menu for filtering program data from an EPG database. A second display area 22 comprises labels of a plurality of subgenres which are subordinate to a selected main genre in the first display area 21. In the example the main genre 'Series' is selected and the second display area 22 comprises labels of more specific categories of series, such as Action, Drama, Soap etc. As is clear from FIG. 2, the second display area 22 has a fixed position with respect to the first display area 21, independent of the selected menu item in the latter area. Instead, a connection indicator 23 is displayed, indicating the relation between the selected main genre, i.e. 'Series', and the selected subgenre, i.e. 'Soap'. The connection indicator 23 comprises the lines 23a and 23b. A third display area 25 shows data relating to the programs which correspond to the filter as defined by the genre menu selections. A further display area 27 may show detailed information about a selected program 26 in the third display area 25, and a menu of actions which may be performed in relation to the selected program, such as 'Record', 'Remind', 'Show' etc.

Selecting another main genre, e.g. 'Culture' would elongate the line 23a so as to connect the label 'Culture' with the second display area 22 (but not with a specific subgenre, i.e. line 23b is not displayed), and all cultural programs available in the EPG database are displayed in the third display area 25. As soon as the user selects a subgenre of said selected main genre, the connection indicator 23b is displayed to connect the label 'Culture' with the selected subgenre label, analogous to the situation as depicted in FIG. 2, and the set of programs displayed in the third display area 25 is further restricted to the newly defined filter.

An arrow 24 indicates that there are more subgenres than can be displayed in the second display area 22. The subgenres may be scrolled, for example, by operating the left/right arrow buttons on a remote control. Likewise, the main genres could be scrolled, if needed, by operating the up/down arrow buttons. While scrolling, the selected (sub) genre may remain the same, or preferably, the selection 'jumps' to the neighboring label in the scroll direction. Such techniques for scrolling and selection are known per se and widely applied.

The set of programs as displayed in the third display area 25 may automatically adapt to a new menu selection or adapt only in response to a user confirmation. After such a confirmation, the focus of user control may shift from the menu to the third display area 25, so that, for example, the up/down buttons now serve to control which program 26 is selected, so as to show the detailed information in the display area 27. The focus of user control may shift back to the menu in response to a further user command, such as a second confirmation or a specific command. Such techniques for changing the focus of control are well known in the art.

Although the invention has been described with reference to particular illustrative embodiments, variants and modifications are possible within the scope of the inventive concept. Thus, for example, instead of rectangular, the display areas may be curved and/or comprise angles. The visual connection between respective menu items of different menu levels may have any other shape as well. The invention can be applied in any device capable of displaying multi-level menus, such as a personal computer, a television receiver, a remote control with a display, a mobile telephone etc.

In summary, the invention relates to a method of displaying a multi-level menu. A first menu level is displayed in a first display area, while, in response to selection of a menu item of the first menu level, a second menu level is displayed in a second display area having a fixed position relative to the first display area, irrespective of the position of the selected menu item of the first menu level. Further menu levels may be displayed in further display areas having a fixed position with respect to the other display areas. Selected items of different menu levels may be visually connected.

The use of the verb 'to comprise' and its conjugations does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware.

A 'computer program' is to be understood as any software product stored on a computer-readable medium, such as a floppy-disk, downloadable via a network, such as the Internet, or marketable in any other manner.

What is claimed is:

1. A method of displaying a multi-level menu, comprising the steps of:
    displaying menu items of a first menu level in a first display area, wherein the menu items of the first menu level have a fixed position relative to a third display area;
    displaying, in response to a selection of a menu item of the first menu level, menu items of a second menu level in a second display area, the second menu level being subordinate to the selected menu item of the first menu level, wherein the second display area has a fixed orthogonal position with respect to the first display area irrespective of a position of the selected menu item of the first menu level, and wherein the first and second display areas extend along different orthogonal borders of the third display area; and
    upon selection of an item from the second menu level displaying a connection indicator connecting the selected menu item of the first menu level and the selected menu item of the second menu level such that the connection indicator traverses both the first display area and the second display area around the different orthogonal borders of the third display area.

2. A method as defined in claim 1, characterized in that the first and the second display areas are oblong and arranged substantially orthogonally relative to each other.

3. A method as defined in claim 2, characterized in that the first and the second display areas extend along adjacent borders of the third display area.

4. A method as defined in claim 3, characterized in that the multi-level menu constitutes a database filter for selecting data objects in accordance with selected menu items, the method further comprising a step of displaying the selected objects in the third display area.

5. A method as defined in claim 4, characterized in that the data objects are programs in an electronic program guide database, and the menu items of the first menu level correspond to main genres of the programs, and the menu items of the second menu level correspond to subgenres of a selected main genre of the first menu level.

6. A method as defined in claim 1, wherein the connection indicator comprises a first line from the selected menu item of the first menu level and a second line to the selected menu item of the second menu level, the second line connected to the first line.

7. A display device comprising multi-level menu means for:
    displaying menu items of a first menu level in a first display area, wherein the menu items of the first menu level have a fixed position relative to a third display area;
    displaying, in response to a selection of a menu item of the first menu level, menu items of a second menu level in a second display area, the second menu level being subordinate to the selected menu item of the first menu level, wherein the second display area has a fixed orthogonal position with respect to the first display area irrespective of a position of the selected menu item of the first menu level, and wherein the first and second display areas extend along different orthogonal borders of the third display area; and
    upon selection of an item from the second menu level displaying a connection indicator connecting the selected menu item of the first menu level and the selected menu item of the second menu level such that the connection indicator traverses both the first display area and the second display area around the different orthogonal borders of the third display area.

8. A display device as defined in claim 7, characterized in that the first and the second display areas are oblong and arranged substantially orthogonally relative to each other.

9. A display device as defined in claim 8, characterized in that the first and the second display areas are positioned along adjacent borders of the third display area.

10. A display device as defined in claim 9, characterized in that the display device further comprises database means for storing a plurality of data objects, and the multi-level menu constitutes a database filter for selecting data objects in accordance with selected menu items, the database means being adapted to display the selected objects in the third display area.

11. A display device as defined in claim 10, characterized in that the display device further comprises electronic program guide means, the data objects being programs in the electronic program guide, and the menu items of the first menu level correspond to main genres of the programs, and the menu items of the second menu level correspond to subgenres of a selected main genre of the first menu level.

12. A display device as defined in claim 7, wherein the connection indicator comprises a first line from the selected menu item of the first menu level and a second line to the selected menu item of the second menu level, the second line connected to the first line.

13. A computer program product on a computer readable medium for performing, when executed on a programmable computing device, the steps of:
    displaying menu items of a first menu level in a first display area, wherein the menu items of the first menu level have a fixed position relative to a third display area;
    displaying, in response to a selection of a menu item of the first menu level, menu items of a second menu level in a second display area, the second menu level being subordinate to the selected menu item of the first menu level, wherein the second display area has a fixed orthogonal position with respect to the first display area irrespective of a position of the selected menu item of the first menu level, and wherein the first and second display areas extend along different orthogonal borders of the third display area; and
    upon selection of an item from the second menu level displaying a connection indicator connecting the selected menu item of the first menu level and the selected menu item of the second menu level such that the connection indicator traverses both the first display area and the second display area around the different orthogonal borders of the third display area.

14. A computer program product as defined in claim 13, characterized in that the first and the second display areas are oblong and arranged substantially orthogonally relative to each other.

15. A computer program product as defined in claim 13, characterized in that the first and the second display areas extend along adjacent borders of the third display area.

16. A computer program product as defined in claim 13, characterized in that the multi-level menu constitutes a database filter for selecting data objects in accordance with selected menu items, the computer program further for performing a step of displaying the selected objects in the third display area.

17. A computer program product as defined in claim 16, characterized in that the data objects are programs in an electronic program guide database, and the menu items of the first menu level correspond to main genres of the programs, and the menu items of the second menu level correspond to subgenres of a selected main genre of the first menu level.

18. A computer program product as defined in claim 13, wherein the connection indicator comprises a first line from the selected menu item of the first menu level and a second line to the selected menu item of the second menu level, the second line connected to the first line.

* * * * *